United States Patent [19]

DiBease

[11] 4,047,800
[45] Sept. 13, 1977

[54] BICYCLE REFLECTOR DEVICE

[75] Inventor: Paul J. DiBease, Ocean City, N.J.

[73] Assignee: The Raymond Lee Organization, Inc., New York, N.Y.; a part interest

[21] Appl. No.: 686,157

[22] Filed: May 13, 1976

[51] Int. Cl.² .............................................. G02B 5/12
[52] U.S. Cl. ..................................... 350/99; 350/97; 301/37 R; 301/37SA
[58] Field of Search ................... 350/99, 97, 103, 105; 301/37 SA, 37 R; 116/28 R; 161/7

[56] References Cited

U.S. PATENT DOCUMENTS

| 2,151,485 | 3/1939 | Pawsat | 350/99 |
| 2,701,540 | 2/1955 | Hamilton | 350/99 |
| 3,528,721 | 9/1970 | La Londe | 350/99 |
| 3,579,408 | 5/1971 | Dowhan | 301/37 SA |
| 3,768,433 | 10/1973 | Dian et al. | 350/97 |

Primary Examiner—John K. Corbin
Assistant Examiner—B. W. delos Reyes
Attorney, Agent, or Firm—Daniel Jay Tick

[57] ABSTRACT

A reflector disc has a light reflective surface and a rim. A mounting device mounts the reflector disc on the rear axle of a bicycle in a manner whereby the disc is positioned vertically and perpendicular to the plane of the rear wheel with the rim of the disc in abutment with the wheel whereby rotation of the rear wheel causes rotation of the disc.

3 Claims, 4 Drawing Figures

BICYCLE REFLECTOR DEVICE

BACKGROUND OF THE INVENTION

The present invention relates to a bicycle reflector device. More particularly, the invention relates to a bicycle reflector device for a bicycle having a rear axle and a rear wheel rotatably mounted on the rear axle.

Objects of the invention are to provide a bicycle reflector device of simple structure, which is inexpensive in manufacture, installed with facility and convenience on new and existing bicycles, and functions efficiently, effectively and reliably to reflect light from the headlights of following vehicles from the rear of a bicycle in a manner whereby the bicycle is readily and instantly observable by the operator of the following vehicle, thereby avoiding accident and injuries to cyclists at night.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
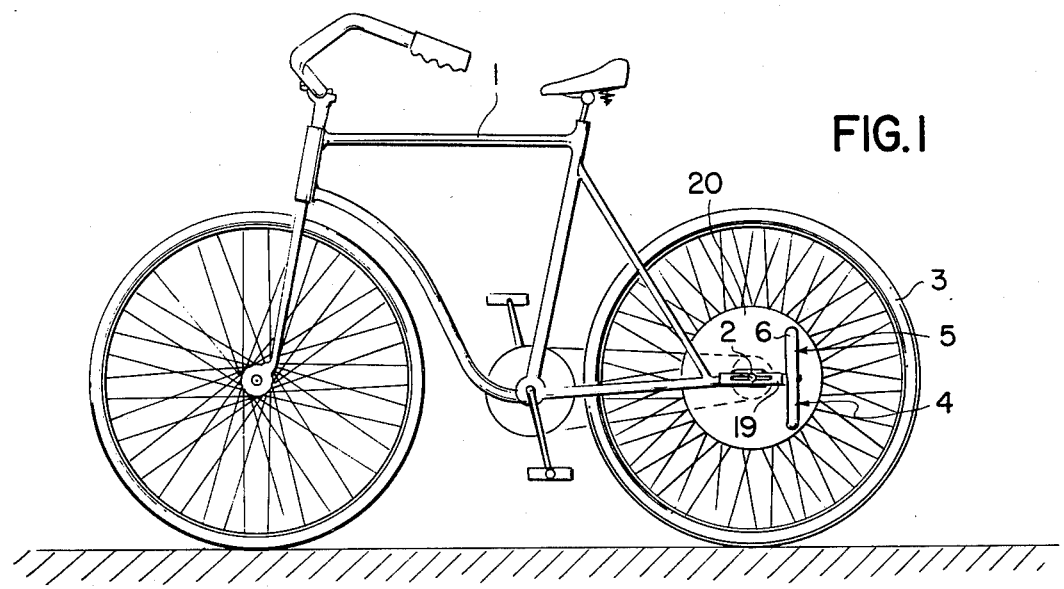
FIG. 1 is a view of an embodiment of the bicycle reflector device of the invention mounted on a bicycle.
Figure 2:
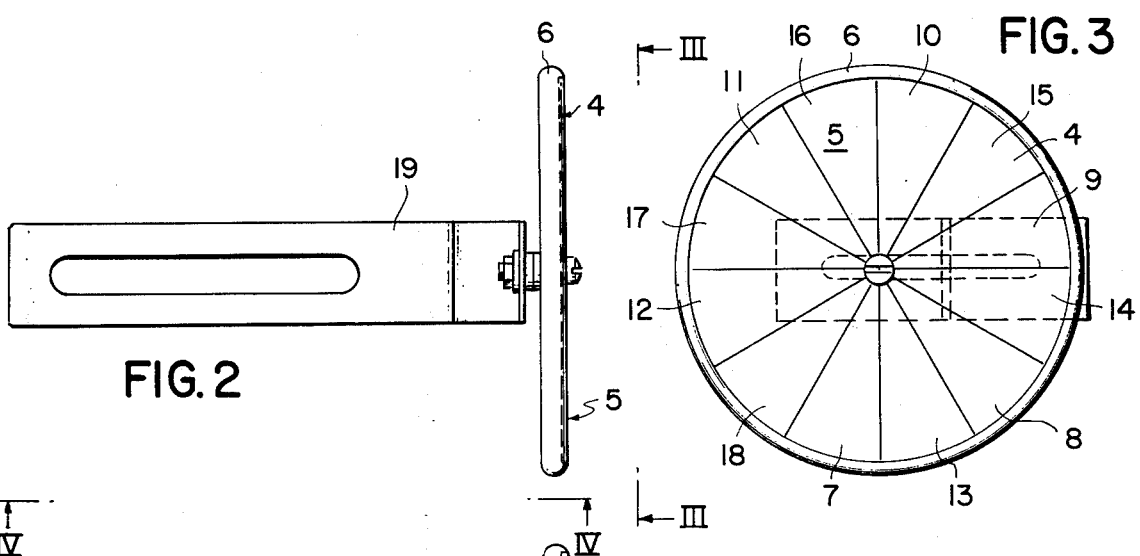
FIG. 2 is a view, on an enlarged scale, of an embodiment of the bicycle reflector device of the invention.

The bicycle reflector device of the invention is for a bicycle 1 having a rear axle 2 and a rear wheel 3 rotatably mounted on the rear axle, as shown in FIG. 1.

The bicycle reflector device of the invention comprises a reflector disc 4 having a light reflective surface 5. The disc has a rim and a rubber tire 6 on the rim.

Figure 3:
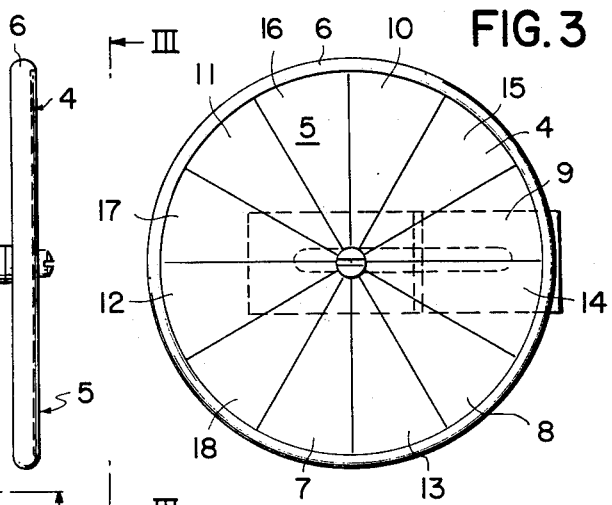
FIG. 3 is a view, taken along the lines III—III, of FIG. 2.

The light reflective surface 5 of the disc 4 is preferably divided into a plurality of sectors of reflective surfaces of alternating colors. Thus, for example, the sectors 7, 8, 9, 10, 11 and 12 may consist of red reflective surfaces and the alternate sectors 13, 14, 15, 16, 17 and 18 may consist of yellow reflective surfaces (FIG. 3).

A mounting device 19 mounts the reflector disc 4 on the rear axle 2 of the bicycle 1 in a manner whereby said disc is positioned substantially vertically and substantially perpendicularly to the plane of the rear wheel 3 with the rim 6 of the disc in abutment with said wheel. Thus, rotation of the rear wheel 3 of the bicycle 1 causes rotation of the disc 4.

Figure 4:
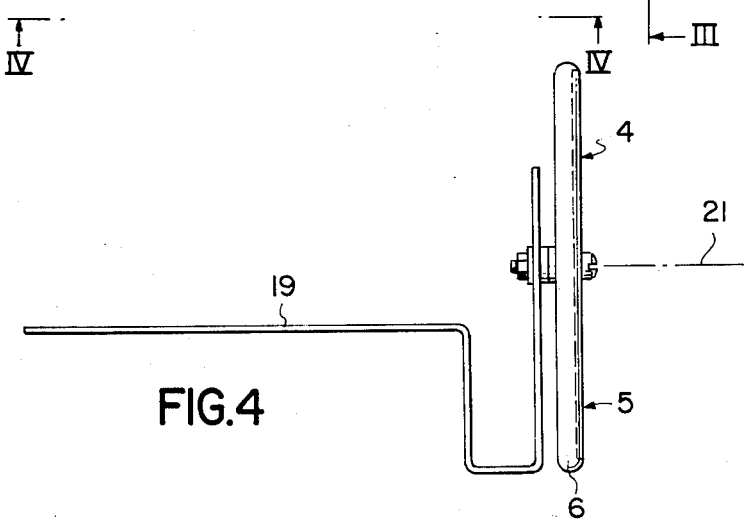
FIG. 4 is a view, taken along the lines IV—IV, of FIG. 2.

The rim 6 of the disc 4 may abut the spokes of the wheel 3, since said rim is covered with a rubber tire. A wheel disc 20 (FIG. 1) is preferably coaxially mounted on the rear wheel 3 of the bicycle 1 and has a diameter smaller than that of the rear wheel. The wheel disc 20 rotates with the rear axle 2 and the rim 6 of the reflector disc 4 abuts said wheel disc thereby rotating said reflector disc about its axis 21 (FIG. 4).

While the invention has been described by means of a specific example and in a specific embodiment, I do not wish to be limited thereto, for obvious modifications will occur to those skilled in the art without departing from the spirit and scope of the invention.

I claim:

1. A bicycle reflector device for a bicycle having a rear axle and a rear wheel rotatably mounted on the rear axle, said bicycle reflector device comprising a wheel disc coaxially mounted on the rear wheel and having a diameter smaller than that of the rear wheel, said wheel disc rotating with the rear axle;

a reflector disc having a light reflective surface, said disc having a rim; and mounting means mounting the reflector disc on the rear axle of a bicycle in a manner whereby said disc is positioned substantially vertically and substantially perpendicularly to the plane of the rear wheel with the rim of the disc in abutment with said wheel whereby rotation of the rear wheel causes rotation of the wheel disc and rotates the reflector disc about its axis.

2. A bicycle reflector device as claimed in claim 1, further comprising a rubber tire on the rim of the disc.

3. A bicycle reflector device as claimed in claim 1, wherein the light reflective surface of the reflector disc comprises a plurality of sectors of reflective means of alternating colors.

* * * * *